United States Patent Office 2,760,949
Patented Aug. 28, 1956

2,760,949
RUBBER PROCESSING

Frank B. Smith, Detroit, Mich., assignor to United States Rubber Company, New York, N. Y., a corporation of New Jersey No Drawing. Application June 12, 1953, Serial No. 361,437

8 Claims. (Cl. 260—41.5)

This invention relates to improvements in the technique of processing mixtures of natural rubber or GR–S and carbon black prior to vulcanization thereof.

The technique of processing rubber mixed with relatively large amounts of reinforcing carbon black, whereby to obtain vulcanizates with improved physical and chemical properties, is described in Gerke et al., U. S. Patent 2,118,601. The improved vulcanizates prepared by the technique of Gerke et al. differ from the usual vulcanizates produced by older techniques in that they have relatively (1) lower modulus at low elongation, (2) higher modulus about 300% elongation, (3) higher resistance to abrasion, (4) lower torsional hysteresis, and (5) higher electrical resistivity, and are (6) relatively softer.

These improved vulcanizates are obtained by incorporating uniformly in the rubber a relatively large amount of reinforcing carbon black, for example, at least 25 parts, and preferably, in the case of tire treads, at least 40 parts, by weight, of carbon black per 100 parts by weight of rubber, and then subjecting the uniformly mixed masterbatch to a special heat treatment at a temperature substantially above 250° F., the preferred temperature being in the range from about 300° F. to 370° F., and masticating the mix during and/or after such heat treatment, or alternately therewith. The duration of the special heat treatment may vary with the temperature employed, the higher the temperature the shorter the time, and is governed also by the degree of change desired in the properties of the ultimate vulcanized product which properties are gauged to be compatible with its final use. In general, heat treatments of from 10 to 60 minutes' duration will be found suitable for most purposes, particularly when the heat treatment is carried out by mastication within the preferred temperature range.

An object of the present invention is to provide chemicals which strongly influence and/or augment the effect of heat treatment of the type referred to above upon rubber-carbon black masterbatches. Stated differently, an object of the invention is to provide catalysts capable of materially promoting the benefits of heat treating rubber-carbon black masterbatches, whereby even greater improvements in tread wear and hysteresis properties can be achieved. Numerous other objects of the present invention will more fully hereinafter appear.

The present invention is based upon my discovery that inorganic peroxidic compounds selected from the group consisting of the peroxides of zinc, magnesium, calcium, strontium and barium, and potassium persulfate are effective catalysts or promoters of the heat treatment at high temperature of carbon black masterbatches in accordance with the technique of Gerke et al. 2,118,601, whereby greater reduction in torsional hysteresis is achieved by the heat treatment.

More specifically, my invention resides in a method of making rubber products and particularly tire treads, by heating an intimate mixture of natural rubber or a rubbery copolymer of butadiene and styrene typified by GR–S, or a mixture of natural rubber and such rubbery copolymer, a rubber-reinforcing carbon black and an inorganic peroxidic compound from the above group at a temperature of at least 275° F. but insufficiently elevated to substantially injure the properties of the rubber for a time sufficient to substantially lower the torsional hysteresis of a vulcanizate of the resulting mixture, masticating the resulting mixture and incorporating vulcanizing and other conventional compounding ingredients, shaping, and vulcanizing.

The temperature at which the heat treatment is conducted will generally not exceed 450° C.

By performing the heat treatment of the carbon black-rubber masterbatch in the presence of the inorganic peroxidic compound, vulcanizates having materially lower hysteresis are obtained. It is generally considered that reductions in torsional hysteresis of the order of .01 or more are sufficiently great to be commercially important. My invention makes it easily possible to obtain reductions in torsional hysteresis considerably greater than .01. It may be noted at this point that the torsional hysteresis of conventionally processed tread stock usually ranges from .1 to .15. Values below .08 usually indicate that a non-conventional hot processing has been employed in the manufacture of the carbon black masterbatch from which the tread stock was made.

The materially lower torsional hysteresis brought about by the practice of my invention is usually accompanied by a significantly higher electrical resistivity of the resulting vulcanizate. It is also accompanied by improved wear-resistance which becomes apparent under specially severe driving conditions where heat generation is an important factor. Thus, the improved wear properties of vulcanizates made in accordance with my invention do not manifest themselves under ordinary driving conditions, for example at relatively low speeds or at relatively moderate atmospheric temperatures. However, they do manifest themselves under very severe driving conditions such as are encountered in the southwestern and western portions of the United States and such as are becoming increasingly prevalent everywhere because of the increased availability of high speed highways and high speed vehicles.

In one method of practicing my invention, I first prepare in the Banbury mixer or on the open rubber mill a carbon black-rubber masterbatch containing intimately dispersed therethrough a small amount of the inorganic peroxidic compound, and, if desired, also containing conventional amounts of any desired non-vulcanizing compounding ingredients, such as small amounts of a softener, fatty acid, e. g., stearic acid, zinc salt of fatty acid, e. g., zinc laurate, etc. In preparing this masterbatch I prefer to employ stock temperatures of at least 275° F. during a considerable portion, say at least 5 minutes, of the mixing cycle. After an intimate uniform masterbatch is obtained, the stock is sheeted out to the desired thickness and the sheeted stock is then heat-treated statically for a substantial period of time, say for from 1 to 24 hours, at a temperature of at least 275° F. until the properties of the stock have been so changed that the torsional hysteresis of a vulcanizate of the resulting mixture is substantially lower than that of a vulcanizate of a comparable mixture made in the conventional manner. After the heat treatment, the stock is re-milled in a rubber mill or in a Banbury mixer, usually at relatively low temperatures, i. e., at stock temperatures of from 100 to 200° F., for a sufficient time, e. g., from 1 to 10 minutes, until any stiffening effect produced by the heat treatment is worked out. This re-milling causes the batch to recover to a smooth plastic consistency. Thereupon the vulcanizing ingredients, e. g. sulfur, accelerators, etc. and any other desired compounding ingredients, are intimately incorporated at a relatively low stock temperature, viz., not over 250° F., whereupon the resulting stock is shaped and vulcanized in the usual way.

Instead of conducting the heat treatment by mastication followed by static holding at temperatures of at least 275° F., I can perform the heat treatment entirely by mastication or entirely by static holding. The procedure wherein the bulk of the heat treatment takes place under static conditions lends itself especially well to factory operation because of the economies thereby effected, it being much cheaper to heat treat statically than by mastication, as on an open rubber mill or in a Banbury mixer. Instead of the modes of procedure which have been mentioned, I could conceivably heat treat first statically and then with mastication or I could employ alternate static and masticatory heat treatments. If the last portion of the heat treatment is done statically, it is necessary to re-mill the stock to smooth it out before incorporating sulfur and other vulcanizing ingredients. If the last portion of the heat treatment is carried out by milling or mastication, it is prolonged usually at a lower temperature, say at 100–250° F., until the stock smooths out.

In practicing my invention I particularly prefer to employ a temperature of at least 350° F. in performing the heat treatment, or at least during a substantial portion thereof. Thus, I can mix in a Banbury mixer at a stock temperature of at least 350° F., say 350–450° F., for 5 to 60 minutes and follow this by static treatment at a lower temperature, say 275–325° F., for a suitable length of time, say 1 to 24 hours.

The duration of the heat treatment will vary, depending upon many factors, including the temperature at which it is conducted, the type of mixture, the amount and type of inorganic peroxidic compound used, whether the heat treatment is performed statically or with mastication, etc. In the case of solely static treatment, times ranging from 1 to 24 hours are commonly employed. In the case of solely masticatory heat treatment, times of the order of 5 to 60 minutes at temperatures of 325–450° F. are usually sufficient. It will be obvious that time and temperature are generally inversely related.

Any of the reinforcing carbon blacks can be used in the practice of my invention. Both furnace blacks and channel blacks are commonly used for reinforcing carbon black and can be used in my invention. The amount of carbon black present during the heat treatment should equal at least 25 parts per 100 parts by weight of rubber. I prefer that the amount of carbon black be equal to at least 40 parts per 100 parts of rubber, the use of such high proportions of carbon black being particularly suitable in the case of tread stocks.

I particularly prefer to employ the peroxides of zinc, magnesium, calcium, strontium and barium. Of these peroxides, I much prefer to employ zinc peroxide because it assures an excellency of hysteresis properties, especially if it is present during mastication of the rubber in the presence of the carbon black at temperatures of the order of 360° F. and higher. In addition, zinc peroxide appears to function as a replacement for zinc oxide which is a fairly expensive filler. This serves to substantially offset the relatively high cost of zinc peroxide.

Instead of the metallic peroxides mentioned above, I can use potassium persulfate.

The amount of the peroxidic compound used in the practice of my invention can vary widely. However, almost invariably the amount is not less than 0.3 nor more than 3.0 parts per 100 parts by weight of rubber. Amounts less than 0.3 part are not sufficient and amounts above 3.0 parts are too costly.

In the practice of my invention, the use of zinc peroxide and a masticatory heat treatment at a temperature of at least 360° F., and preferably at least 400° F., gives an unusual synergistic effect and produces maximum lowering in hysteresis and maximum increase in electrical resistivity. Thus, a preferred mode of practicing my invention involves masticating the rubber-carbon black-zinc peroxide mixture at 350–450° F. for 5 to 60 minutes, usually followed by static holding at 275–325° F. for 1 to 24 hours. The time of mastication again will depend upon the temperature, being in general shorter as the temperature is raised.

To obtain the results of my invention it is essential that the carbon black be present in the mixture at the time of the heat treatment. Thus, I have found that if a mixture of rubber and zinc peroxide be subjected to the heat treatment in the absence of the carbon black, there is little if any effect upon the hysteresis of the vulcanizate of the mixture obtained upon incorporation of carbon black with the heat treated mixture.

The following examples illustrate my invention in more detail:

Examples 1 to 6

The following stocks were first prepared in the usual way, in a Banbury mixer:

| Example | 1 | 2 | 3 | 4 | 5 | 6 |
| --- | --- | --- | --- | --- | --- | --- |
| Smoked Sheets | 90.40 | 90.40 | 90.40 | 90.40 | 90.40 | 90.40 |
| MPC Black | 60 | 60 | 60 | 60 | 60 | 60 |
| Pine Tar | 3.20 | 3.20 | 3.20 | 3.20 | 3.20 | 3.20 |
| Stearic Acid | 4 | 4 | 4 | 4 | 4 | 4 |
| Zinc Laurate | 2 | 2 | 2 | 2 | 2 | 2 |
| Zinc Oxide | .50 | .50 | .50 | | | |
| Zinc Peroxide | | | | .50 | .50 | .50 |
| Banbury Discharge Temperature, °F | 320 | 340 | 385 | 295 | 350 | 400 |

The mixing in the Banbury was continued only long enough to give an intimate uniform mixture. The Banbury was discharged with the stocks at the temperature indicated in the table whereupon the stocks were sheeted out to a thickness of 100 gauge. The sheeted stocks were then heat-treated statically for two and one-half hours in an atmosphere of steam at 500 p. s. i. gauge (approximately 298° F.). The resulting stocks were then re-milled in the Banbury for 4 minutes to eliminate their stiffness and prepare them for compounding. The viscosities of the resulting stocks were:

| Example | 1 | 2 | 3 | 4 | 5 | 6 |
| --- | --- | --- | --- | --- | --- | --- |
| Mooney Viscosity (LR) | 82.5 | 86 | 59.5 | 84.5 | 71 | 60 |

The stocks were then compounded with conventional amounts of sulfur and accelerators and vulcanized in the usual way. The vulcanizates had the following properties:

| Example | 1 | 2 | 3 | 4 | 5 | 6 |
| --- | --- | --- | --- | --- | --- | --- |
| 300% Modulus, p. s. i.: | | | | | | |
| 30' cure | 2,530 | 2,820 | 2,630 | 2,490 | 2,700 | 2,730 |
| 45' cure | 2,810 | 2,800 | 2,830 | 2,690 | 2,830 | 2,860 |
| 90' cure | 2,790 | 2,850 | 2,860 | 2,700 | 2,810 | 2,820 |
| Tensile, p. s. i.: | | | | | | |
| 30' cure | 4,400 | 4,230 | 4,370 | 4,430 | 4,300 | 4,130 |
| 45' cure | 4,280 | 4,230 | 4,080 | 4,200 | 4,210 | 4,020 |
| 90' cure | 4,030 | 3,830 | 3,830 | 4,020 | 3,800 | 3,600 |
| Elongation: | | | | | | |
| 30' cure | 455 | 427 | 447 | 477 | 437 | 407 |
| 45' cure | 425 | 420 | 395 | 427 | 407 | 380 |
| 90' cure | 415 | 377 | 377 | 403 | 370 | 350 |
| Torsional Hysteresis: | | | | | | |
| 30' cure | .097 | .094 | .077 | .084 | .064 | .067 |
| 45' cure | .088 | .089 | .063 | .076 | .074 | .069 |
| 90' cure | .094 | .096 | .079 | .087 | .079 | .073 |
| Log of Electrical Resistivity (ohm-centimeters): | | | | | | |
| 30' cure | 9.98 | 10.01 | 12.64 | 11.46 | 12.34 | >13.04 |
| 45' cure | 9.64 | 9.63 | 12.21 | 11.06 | 11.84 | >13.04 |
| 90' cure | 9.33 | 9.44 | 11.90 | 12.06 | 11.90 | >13.04 |

The vulcanizates of Examples 4 to 6 had higher abrasion-resistance, as measured on the laboratory abrader, than those of Examples 1 to 3. In general the laboratory abrasion ratings follow rather closely the trends noted in connection with electrical resistivity. That is, higher resistivity and improved abrasion rating tend to accompany the use of both zinc peroxide and higher Banbury temperatures in the carbon black masterbatch mixing.

The material reduction in torsional hysteresis of stocks 4 to 6 is to be noted. A reduction of .002 or more in this test is considered significant and important. The accompanying marked increase in electrical resistivity in stocks 4 to 6 is to be noted. The data show that greatly improved physical properties result from the use of the zinc peroxide in stocks 4 to 6.

With the standard "hot process" stocks (Examples 1 to 3) the resistivity reaches a maximum at or before the 30-minute cure and thereafter falls off with increasing time of vulcanization. In the case of the zinc peroxide-activated stocks (Examples 4 to 6) the resistance tends to remain more nearly constant up to the 90-minute cure, showing, if anything, a slight increase in value.

The use in Example 6 of both zinc peroxide and a 400° F. Banbury discharge temperature resulted in a synergistic effect and produced the best resistivity values, which exceeded the capacity of the measuring instrument on the three cures tested, and the best laboratory abrasion rating.

*Examples 7 to 9*

Examples 4 to 6 were duplicated exactly except that the zinc peroxide was replaced with an equal weight of potassium persulfate and that the Banbury discharge temperatures were 300° F., 355° F. and 400° F., respectively. The data on the vulcanizates were as follows:

| Example | 7 | 8 | 9 |
|---|---|---|---|
| 300% Modulus: | | | |
| 30' cure | 2,700 | 2,830 | 2,840 |
| 45' cure | 2,900 | 3,030 | 2,990 |
| 90' cure | 2,930 | 3,200 | 2,990 |
| Tensile: | | | |
| 30' cure | 4,320 | 4,230 | 4,230 |
| 45' cure | 4,100 | 4,200 | 4,130 |
| 90' cure | 3,980 | 3,890 | 3,790 |
| Elongation: | | | |
| 30' cure | 440 | 413 | 407 |
| 45' cure | 393 | 387 | 390 |
| 90' cure | 375 | 350 | 350 |
| Torsional Hysteresis: | | | |
| 30' cure | .074 | .067 | .068 |
| 45' cure | .078 | .063 | .065 |
| 90' cure | .083 | .066 | .067 |
| Log Resistivity: | | | |
| 30' cure | 9.95 | 11.82 | 12.15 |
| 45' cure | 9.69 | 11.88 | 11.71 |
| 90' cure | 9.47 | 11.63 | 11.62 |

*Examples 10 to 13*

Example 6 was duplicated, using 0.5, 1.5 and 3.0 parts of zinc peroxide and using the temperature of steam at 60 lbs. gauge (approximately 308° F.) in the static heat treatment. Example 13 was a control in which the zinc peroxide was replaced with 0.5 part of zinc oxide. The data on the vulcanizates were as follows:

| Example | 10 | 11 | 12 | 13 |
|---|---|---|---|---|
| Amount of ZnO₂ used | .5 | 1.5 | 3.0 | |
| Torsional Hysteresis: | | | | |
| 30' cure | .074 | .069 | .070 | .078 |
| 45' cure | .068 | .069 | .070 | .073 |
| 90' cure | .070 | .070 | .076 | .76 |
| 300% Modulus, p. s. i.: | | | | |
| 30' cure | 2,500 | 2,520 | 2,520 | 2,470 |
| 45' cure | 2,700 | 2,700 | 2,620 | 2,680 |
| 90' cure | 2,710 | 2,640 | 2,300 | 2,800 |
| Tensile, p. s. i.: | | | | |
| 30' cure | 3,750 | 3,660 | 3,420 | 3,900 |
| 45' cure | 3,480 | 3,540 | 3,260 | 3,940 |
| 90' cure | 3,790 | 3,100 | 2,720 | 3,700 |
| Elongation: | | | | |
| 30' cure | 400 | 395 | 375 | 435 |
| 45' cure | 365 | 370 | 360 | 405 |
| 90' cure | 345 | 340 | 340 | 370 |

*Examples 14 and 15*

The following stocks, in which a minor proportion of the natural rubber was replaced by balata, were prepared in a Banbury mixer:

| Example | 14 | 15 |
|---|---|---|
| Smoked sheets | 80.40 | 80.40 |
| Balata | 10 | 10 |
| MPC Black | 60 | 60 |
| Pine Tar | 3.20 | 3.20 |
| Stearic Acid | 4 | 4 |
| Zinc Laurate | 2 | 2 |
| Zinc Oxide | .50 | |
| Zinc Peroxide | | 1.00 |

These ingredients were processed in the same way as in Examples 1 to 6, the Banbury discharge temperature being 325° F. and 330° F., respectively. After sheeting to 100 gauge and static heat treatment for two and one-half hours at the temperature of steam at 50 p. s. i. gauge the resulting stocks were re-milled in the Banbury for 4 minutes and compounded in the same way as before. The vulcanizates had the following physicals:

| Example | 14 | 15 |
|---|---|---|
| 300% Modulus: | | |
| 30' cure | 2,440 | 2,680 |
| 45' cure | 2,800 | 2,800 |
| 90' cure | 2,700 | 2,700 |
| Tensile: | | |
| 30' cure | 4,030 | 3,543 |
| 45' cure | 3,660 | 3,640 |
| 90' cure | 3,590 | 3,530 |
| Elongation: | | |
| 30' cure | 450 | 380 |
| 45' cure | 380 | 370 |
| 90' cure | 367 | 370 |
| Torsional Hysteresis: | | |
| 30' cure | .113 | .087 |
| 45' cure | .108 | .073 |
| 90' cure | .113 | .083 |

The marked reduction in torsional hysteresis in the vulcanizate of Example 15 which was activated with zinc peroxide compared to Example 14 is noteworthy.

*Examples 16 to 21*

These examples illustrate a purely masticatory process. The following formulations were mixed on an open rubber mill at the mill temperature shown:

| Example | 16 | 17 | 18 | 19 | 20 | 21 |
|---|---|---|---|---|---|---|
| Smoked sheets | 90.40 | 90.40 | 90.40 | 90.40 | 90.40 | 90.40 |
| MPC Black | 60 | 60 | 60 | 60 | 60 | 60 |
| Pine Tar | 3.20 | 3.20 | 3.20 | 3.20 | 3.20 | 3.20 |
| Stearic Acid | 4 | 4 | 4 | 4 | 4 | 4 |
| Zinc Oxide | .50 | .50 | | | | |
| Zinc Peroxide | | | 1.00 | 1.00 | 1.00 | 1.00 |
| Mill Roll Temp., °F | 200 | 360 | 360 | 360 | 360 | 360 |
| Extra Milling Time, Minutes | | | | 5 | 10 | 20 |
| Mooney Viscosity (LR) at End of Milling | 70.5 | 63 | 73 | 62 | 54 | 43.5 |

In preparing the mixtures, the rubber was allowed to band and heat up to the mill roll temperature before incorporating the other ingredients. In Examples 16 to 18 the milling time was only that required to yield a uniform mixture, while in Examples 19 to 21 the milling was continued for the additional period indicated in the above table.

The resulting mixtures were then compounded in the conventional manner with sulfur and other compounding ingredients and vulcanized. The vulcanizates had the following properties:

| Example | 16 | 17 | 18 | 19 | 20 | 21 |
|---|---|---|---|---|---|---|
| 300% Modulus, p. s. i.: | | | | | | |
| 30' cure | 2,170 | 2,440 | 2,380 | 2,440 | 2,440 | |
| 45' cure | 2,390 | 2,500 | 2,590 | 2,640 | 2,650 | |
| 90' cure | 2,650 | 2,770 | | | | |
| Tensile, p. s. i.: | | | | | | |
| 30' cure | 4,000 | 3,720 | 3,260 | 2,820 | 3,020 | 2,360 |
| 45' cure | 3,990 | 3,720 | 2,830 | 3,200 | 3,030 | 2,390 |
| 90' cure | 4,080 | 3,490 | 2,430 | 2,700 | 2,520 | 1,920 |
| Elongation: | | | | | | |
| 30' cure | 500 | 480 | 385 | 333 | 357 | 300 |
| 45' cure | 473 | 413 | 317 | 345 | 323 | 280 |
| 90' cure | 415 | 360 | 280 | 300 | 285 | 240 |
| Torsional Hysteresis: | | | | | | |
| 30' cure | .144 | .083 | .082 | .076 | .071 | .071 |
| 45' cure | .142 | .093 | .083 | .072 | .075 | .071 |
| 90' cure | .153 | .087 | .075 | .069 | .073 | .067 |

It will be seen that the purely masticatory treatment with zinc peroxide (Examples 18 to 21) gave a significantly lower torsional hysteresis than the same treatment with zinc oxide (Example 17).

Examples 22 to 27

These examples show the effect of static heat treatment in addition to the masticatory heat treatment of Examples 16 to 21. Portions of the hot milled stocks of Examples 16 to 21 were subjected to static heat treatment for two and one-half hours at the temperature of steam at 50 p. s. i. gauge. The resulting stocks were then re-milled in a Banbury mixer for 4 minutes after which the same vulcanizing and other compounding ingredients as were used in Examples 16 to 21 were incorporated, followed by vulcanization.

The following data were obtained:

| Example | 22 | 23 | 24 | 25 | 26 | 27 |
|---|---|---|---|---|---|---|
| Mooney Viscosity Before Compounding | 61.5 | 54 | 53 | 45.5 | 41.5 | 37 |
| 300% Modulus, p. s. i.: | | | | | | |
| 30′ cure | 2,630 | 2,700 | | | | |
| 45′ cure | 2,730 | 2,820 | | 2,700 | | |
| 90′ cure | 2,830 | 2,910 | | | | |
| Tensile, p. s. i.: | | | | | | |
| 30′ cure | 3,790 | 3,290 | 2,300 | 2,380 | 2,840 | 2,130 |
| 45′ cure | 3,900 | 3,490 | 2,530 | 2,980 | 2,390 | 2,300 |
| 90′ cure | 3,780 | 3,260 | 2,200 | 2,410 | 2,220 | 2,100 |
| Elongation: | | | | | | |
| 30′ cure | 413 | 350 | 270 | 283 | 287 | 260 |
| 45′ cure | 410 | 363 | 287 | 313 | 270 | 277 |
| 90′ cure | 375 | 323 | 260 | 277 | 247 | 260 |
| Torsional Hysteresis: | | | | | | |
| 30′ cure | .098 | .076 | .072 | .067 | .072 | .069 |
| 45′ cure | .092 | .074 | .072 | .058 | .062 | .062 |
| 90′ cure | .093 | .074 | .069 | .059 | .065 | .069 |

Comparison of these data with the data for Examples 16 to 21 shows that a static heat treatment following masticatory heat treatment in the presence of zinc peroxide gives a further substantial reduction in torsinal hysteresis.

Having thus described my invention, what I claim and desire to protect by Letters Patent is:

1. A method of manufacturing rubber products which comprises heat treating an intimate mixture of a rubber selected from the group consisting of natural rubber and butadiene-styrene rubbery copolymers, a rubber-reinforcing carbon black and an inorganic peroxidic compound selected from the group consisting of the peroxides of zinc, magnesium, calcium, strontium and barium, and potassium persulfate at a temperature of at least 275° F. but insufficiently elevated to substantially injure the properties of the rubber for a time sufficient to substantially lower the torsional hysteresis of a vulcanizate of the resulting mixture, masticating the mixture and incorporating vulcanizing and other desired compounding ingredients, shaping, and vulcanizing.

2. The method of claim 1 wherein said heat treatment is carried out under static conditions and is followed by remilling prior to incorporation of said vulcanizing and other desired ingredients.

3. The method of claim 1 wherein said heat treatment is carried out by masticating said mixture at said temperature.

4. The method of claim 1 wherein said heat treatment is carried out by masticating said mixture at said temperature and then holding the mixture under static conditions at said temperature.

5. The method of claim 1 wherein said compound is zinc peroxide.

6. The method of claim 1 wherein said compound is zinc peroxide and wherein said heat treatment is at least partially performed by mastication at a temperature of at least 360° F.

7. The method of claim 1 wherein said compound is potassium persulfate.

8. The method of manufacturing rubber products which comprises masticating at a temperature of 350° to 450° F. a mixture of a rubber selected from the group consisting of natural rubber and butadiene-styrene rubbery copolymers, at least 40 parts of a rubber-reinforcing carbon black per 100 parts of said rubber, and from 0.3 to 3.0 parts of zinc peroxide per 100 parts of said rubber, sheeting the resulting stock, and heat-treating the sheeted stock at a temperature of from 275 to 325° F. while holding it under static conditions, the effect of the masticatory and static heat treatment being to substantially lower the torsional hysteresis of a vulcanizate of the resulting mixture, re-milling the resulting stock, incorporating vulcanizing and other desired compounding ingredients, shaping, and vulcanizing.

References Cited in the file of this patent

UNITED STATES PATENTS

| 2,188,601 | Gerke et al. | May 24, 1938 |
| 2,582,829 | Harbison | Jan. 15, 1952 |